US010552132B2

(12) United States Patent
Seo et al.

(10) Patent No.: US 10,552,132 B2
(45) Date of Patent: Feb. 4, 2020

(54) BINARY MERGING DEVICE, METHOD, AND COMPUTER PROGRAM

(71) Applicant: LINE Corporation, Shinjuku-ku, Tokyo (JP)

(72) Inventors: Dong Pil Seo, Seongnam-si (KR); Seong Yeol Lim, Seongnam-si (KR); Kwang Hee Han, Seongnam-si (KR); Sung Beom Ahn, Seongnam-si (KR); Wang Jin Oh, Seongnam-si (KR); Sang Hun Jeon, Seongnam-si (KR)

(73) Assignee: Line Corporation, Tokyo (JP)

( * ) Notice: Subject to any disclaimer, the term of this patent is extended or adjusted under 35 U.S.C. 154(b) by 220 days.

(21) Appl. No.: 15/837,431

(22) Filed: Dec. 11, 2017

(65) Prior Publication Data

US 2018/0121181 A1 May 3, 2018

Related U.S. Application Data

(63) Continuation of application No. PCT/KR2016/004716, filed on May 4, 2016.

(30) Foreign Application Priority Data

Jun. 11, 2015 (KR) ........................ 10-2015-0082727

(51) Int. Cl.
*H04L 29/00* (2006.01)
*G06F 8/52* (2018.01)
(Continued)

(52) U.S. Cl.
CPC .................. *G06F 8/52* (2013.01); *G06F 8/30* (2013.01); *G06F 21/14* (2013.01); *G06F 12/1009* (2013.01); *G06F 2212/1008* (2013.01)

(58) Field of Classification Search
CPC ... G06F 8/52; G06F 21/14; G06F 8/30; G06F 2212/1008; G06F 12/1009; G06F 16/00
See application file for complete search history.

(56) References Cited

U.S. PATENT DOCUMENTS

| 2002/0032804 A1* | 3/2002 | Hunt | ................. G06F 8/443 719/320 |
| 2005/0183094 A1* | 8/2005 | Hunt | ................. G06F 9/465 719/315 |

(Continued)

FOREIGN PATENT DOCUMENTS

| KR | 10-0259447 B1 | 6/2000 |
| KR | 2013-0003836 A | 1/2013 |

(Continued)

OTHER PUBLICATIONS

Luo et al., "Semantics-based obfuscation-resilient binary code similarity comparison with applications to software plagiarism detection", Proceedings of the 22nd ACM SIGSOFT International Symposium on Foundations of Software Engineering, pp. 389-400, Hong Kong, China—Nov. 16-21, (Year: 2014).*

(Continued)

*Primary Examiner* — Morshed Mehedi
(74) *Attorney, Agent, or Firm* — Harness, Dickey & Pierce, P.L.C.

(57) ABSTRACT

According to various example embodiments, a first binary, i.e., an original binary of an application, and a second binary to be added to the application may be merged in a binary form without having to modify a source code.

7 Claims, 9 Drawing Sheets

(51) Int. Cl.
*G06F 8/30* (2018.01)
*G06F 21/14* (2013.01)
*G06F 12/1009* (2016.01)

(56) References Cited

U.S. PATENT DOCUMENTS

| | | | | |
|---|---|---|---|---|
| 2008/0092129 | A1* | 4/2008 | Prakash | G06F 8/433 717/162 |
| 2010/0088689 | A1* | 4/2010 | Levi | G06F 9/451 717/168 |
| 2010/0088690 | A1 | 4/2010 | Levi et al. | |
| 2014/0019776 | A1* | 1/2014 | Lewak | G06F 21/6227 713/193 |
| 2014/0059525 | A1* | 2/2014 | Jawa | G06F 21/53 717/162 |
| 2015/0120011 | A1* | 4/2015 | Rolfsmeier | G05B 19/0426 700/83 |
| 2015/0317139 | A1* | 11/2015 | Tallam | G06F 8/4434 717/151 |

FOREIGN PATENT DOCUMENTS

| | | |
|---|---|---|
| KR | 10-1328012 B1 | 11/2013 |
| WO | WO-2017/134080 A1 | 8/2017 |

OTHER PUBLICATIONS

Korean Office Action for Korean Application No. 10-2015-0082727 dated Apr. 19, 2016.
Korean Decision to Grant for Korean Application No. 10-2015-0082727 dated Apr. 6, 2017.
International Search Report PCT/ISA/210 for International Application No. PCT/KR2016/004716 dated Aug. 23, 2016.
Written Opinion of the International Searching Authority PCT/ISA/237 for International Application No. PCT/KR2016/004176 dated Aug. 23, 2016.

* cited by examiner

BINARY MERGING DEVICE, METHOD, AND COMPUTER PROGRAM

CROSS-REFERENCE TO RELATED APPLICATIONS

This U.S. non-provisional application is a continuation of, and claims the benefit of priority under 35 U.S.C. § 365(c) from, PCT International Application No. PCT/KR2016/004716 which has an International filing date of May 4, 2016, which designates the United States of America, and Korean Patent Application No. 10-2015-0082727, filed on Jun. 11, 2015 in the Korean Intellectual Property Office (KIPO), the contents of both of which are hereby incorporated by reference in their entirety.

TECHNICAL FIELD

The present disclosure relates to a binary merging device, a method, and a computer program, and more particularly, to a binary merging device, a method, and/or a non-transitory computer readable medium including a computer program, in which a first binary, i.e., original binary code of an application, and a second binary (e.g., second binary code) to be added to the application are merged in a binary form without having to modify the source code.

BACKGROUND

Currently, in most software development processes and development works using tools used in software application development, developers need to perform source code operations for realizing business logic upon receiving instructions from a demand issuer (e.g., business clients, staff, etc.) or a software designer, and need to prepare all functions of database input/output (I/O), hardware control, operating system control, and security management required to realize such business logic for each unit module of the software application.

SUMMARY

Provided are a binary merging device, a method, and/or a non-transitory computer readable medium including a computer program, in which a first binary, e.g., original binary code of a software application, and a second binary, e.g., second binary code, to be added to the application are merged in a binary form without having to modify a source code.

According to an aspect of at least one example embodiment, a binary merging method performed by a binary merging device, the binary merging device including a memory storing a first binary; and a controller, wherein the binary merging method includes: generating, by the controller, a second binary to be injected into the first binary; and generating, by the controller, a final binary, in which the first binary and the second binary are merged. According to some example embodiments, the final binary is implemented to execute the second binary using a second programming interface, replace the second programming interface with a first programming interface, and execute the first binary using a first programming interface. According to some example embodiments, the first programming interface includes a reference relationship between at least one first function and external files called by the at least one first function based on a first address table, the first address table includes an address value of an area where the at least one first function included in a first source file that is a source of the first binary is defined, the second programming interface includes a reference relationship between at least one second function and external files called by the at least one second function based on a second address table, and the second address table includes an address value of an area where the at least one second function included in a second source file that is a source of the second binary is defined.

According to some example embodiments, the final binary may be implemented to sequentially extract a function name of a function included in the first programming interface and an address value in which the function is defined, individually compare whether the extracted function name and address value are included in the second programming interface, and when it is determined that the second programming interface is not completely the same as the first programming interface based on a result of the comparison, replace the second programming interface with the first programming interface.

According to some example embodiments, the binary merging method may further include, after the generating of the second binary, obfuscating, by the controller, the first binary, wherein the second binary may include a function for decoding the obfuscated first binary.

According to an aspect of another example embodiment, a binary merging device includes: a code generator configured to generate a second binary to be injected into a first binary; a processor configured to generate a final binary in which the first binary and the second binary are merged; a first reference analyzer configured to generate a first programming interface which includes a reference relationship between at least one first function and external files called by the at least one first functions based on a first address table; and a second reference analyzer configured to generate a second programming interface which includes a reference relationship between at least one second function and external files called by the at least one second function based on a second address table, wherein the final binary is implemented to execute the second binary using the second programming interface, replace the second programming interface with the first programming interface, and execute the first binary using the first programming interface, the first address table comprises an address value of an area where the at least one first function included in a first source file that is a source of the first binary is defined, and the second address table includes an address value of an area where the at least one second function included in a second source file that is a source of the second binary is defined.

The final binary may be implemented to sequentially extract a function name of a function included in the first programming interface and an address value in which the function is defined, individually compare whether the extracted function name and address value are included in the second programming interface, and replace the second programming interface with the first programming interface when it is determined that the second programming interface is not completely the same as the first programming interface based on a result of the comparison.

The binary merging device may further include an obfuscator configured to obfuscate the first binary, wherein the second binary may include a function for decoding the obfuscated first binary.

According to an aspect of another example embodiment, a non-transitory computer-readable recording medium stores computer-readable instructions, which when executed by a processor, cause the processor to perform the method.

In addition, other methods, devices, and other systems for realizing the example embodiments of the present disclosure, and/or a non-transitory computer-readable recording medium having recorded thereon a computer program for executing the methods may be further provided.

These and/or other aspects will become apparent and more readily appreciated from the following description of the example embodiments, taken in conjunction with the accompanying drawings.

According to various example embodiments of the present disclosure, a first binary, e.g., original binary code of a software application, and a second binary, e.g., second binary code, to be added to the application may be merged in a binary form without having to modify a source code.

DESCRIPTION OF THE DRAWINGS

FIGS. 9A and 9B are diagrams for describing a binary structure, wherein FIG. 9A is a diagram of a structure of a first binary before merging binaries, and FIG. 9B is a diagram of a structure of a final binary in which the first binary and a second binary are merged according to some example embodiment of the present disclosure.

DETAILED DESCRIPTION

Figure 1:
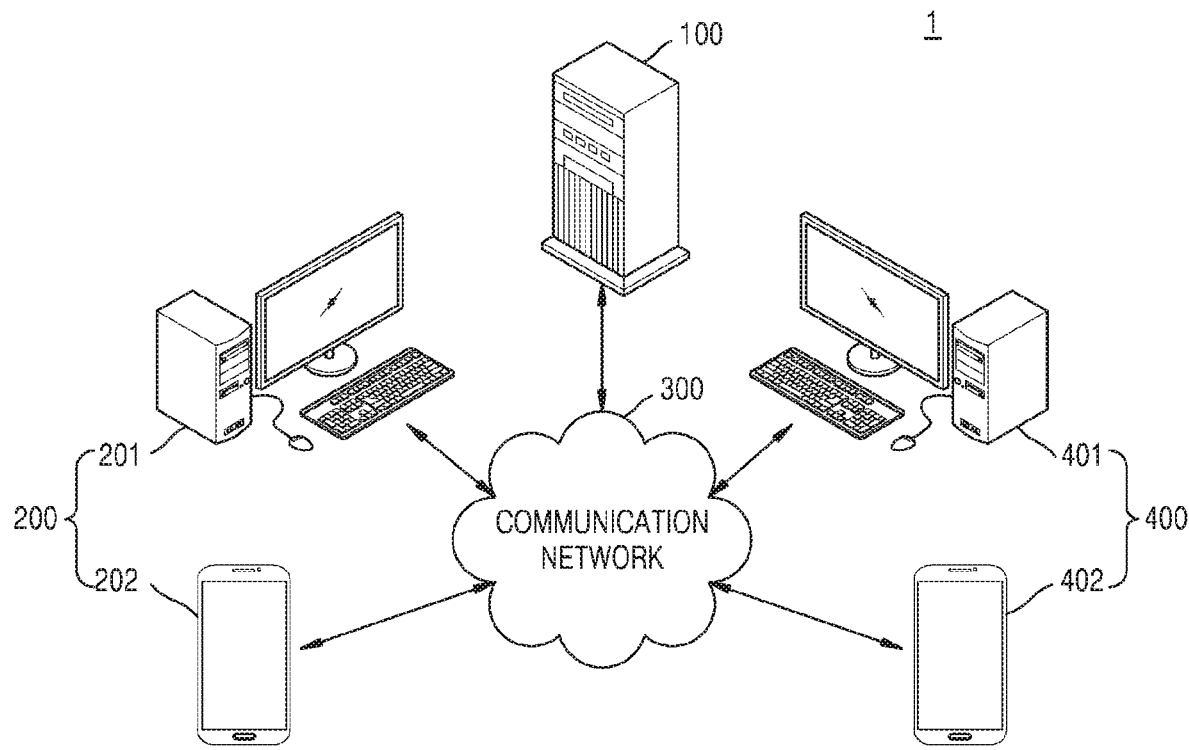
FIG. 1 is a diagram of a binary distribution system according to at least one example embodiment of the present disclosure.

As the disclosure allows for various changes and numerous example embodiments, particular example embodiments will be illustrated in the drawings and described in detail in the written description. Advantages and features of the example embodiments and methods of accomplishing the same may be understood more readily by reference to the following detailed description of the example embodiments and the accompanying drawings. In this regard, the present example embodiments may have different forms and should not be construed as being limited to the descriptions set forth herein.

Hereinafter, various example embodiments of the present disclosure will be described with reference to accompanying drawings. Those components that are the same or are in correspondence are rendered the same reference numeral regardless of the figure number, and redundant explanations are omitted.

While such terms as "first", "second", etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that terms such as "including" or "having," etc., are intended to indicate the existence of features or components, and are not intended to preclude the possibility that one or more other features or components may exist or may be added.

When a certain example embodiment may be implemented differently, a specific process order may be performed differently from the described order. For example, two consecutively described processes may be performed substantially at the same time or performed in an order opposite to the described order.

In the present specification, "circuit" may include, for example, a hardwired circuit storing an instruction executed by a programmable circuit, a programmable circuit, a state machine circuit, and/or firmware independently or in an arbitrary combination. An application may be implemented in a computer readable code or computer readable instruction executable on a programmable circuit, such as a host processor or another programmable circuit. A module used in an arbitrary example embodiment of the present disclosure may be implemented as a circuit. A circuit may be implemented as an integrated circuit, such as an integrated circuit chip.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware and/or a combination of hardware and software.

FIG. 1 is a diagram of a binary distribution system 1 according to at least one example embodiment of the present disclosure.

Referring to FIG. 1, the binary distribution system 1 according to at least one example embodiment of the present disclosure may include a binary merging device 100, user terminals 200 and 400, and a communication network 300, but is not limited thereto.

The binary merging device 100 performs a function of merging a first binary (e.g., first binary code) and a second binary (e.g., second binary code). The binary merging device 100 may generate a final binary in which the first binary and the second binary are merged by generating the second binary for obfuscating the first binary. An entry point of the final binary of an application generated by the binary merging device 100 becomes the second binary. Also, through the binary merging device 100, the generated second binary performs a function of decoding the first binary, and performs a function of replacing an address table for the second binary with an address table for the first binary.

Also, the binary merging device 100 receives an original binary of at least one application (e.g., software application, computer program, app, etc.) from the user terminals 200 and 400, obfuscates the original binary, generates a security binary for decoding the obfuscated binary, and finally, generates a final binary in which the security binary is merged with the original binary of each application. Here, a manager may be a person who generates a binary of an application and/or who manages the binary merging device 100, etc.

A user downloads a binary for an application through the user terminals 200 and 400. The user terminals 200 and 400 execute the downloaded binary.

A plurality of user terminals 200 denote communication terminals capable of using a web service in a wired and/or wireless communication environment. Here, a user terminal 200 may be a personal computer (PC) 201 of a user or a mobile terminal 202 of the user, but is not limited thereto. In FIG. 1, the mobile terminal 202 is shown as a smart phone, but example embodiments of the present disclosure are not limited thereto, and a terminal in which an application capable of web browsing installed as described above may be unlimitedly employed.

In more detail, the user terminal 200 may include a computer (for example, a desktop computer, a laptop computer, a tablet computer, etc.), a media computing platform (for example, a cable, a satellite setup box, a digital video recorder, etc.), a handheld computing device (for example, a portable digital assistant (PDA), an email client, etc.), an arbitrary form of a mobile phone, or an arbitrary form of another type of computing or communication platform, but is not limited thereto.

Meanwhile, the communication network 300 connects the plurality of user terminals 200 and the binary merging device 100. In other words, the communication network 300 denotes a communication network that provides an access path for the user terminals 200 to access and then exchange data with the binary merging device 100. The communication network 300 may be a wired network, such as a local area network (LAN), a wide area network (WAN), a metropolitan area network (MAN), an integrated service digital network (ISDN), etc., and/or a wireless network, such as a wireless LAN, CDMA, Bluetooth, satellite communication, etc., but the example embodiments of the present disclosure are not limited thereto.

Figure 2:
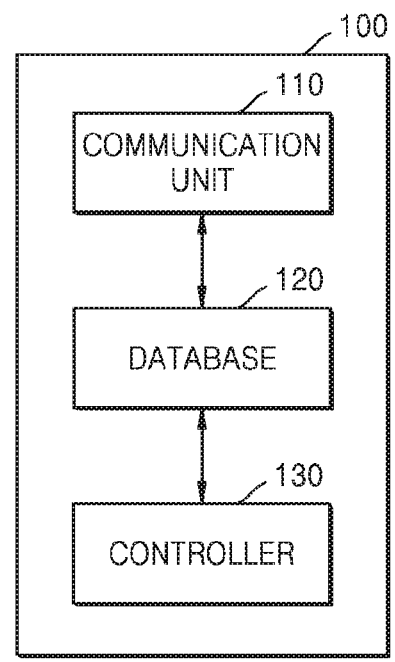
FIG. 2 is a block diagram of a binary merging device according to at least one example embodiment of the present disclosure.

FIG. 2 is a block diagram of the binary merging device 100 according to at least one example embodiment of the present disclosure.

Referring to FIG. 2, the binary merging device 100 may include a communication unit 110, a database 120, and/or a controller 130, but is not limited thereto.

The communication unit 110 may include one or more components enabling communication between the binary merging device 100 and at least one user terminal 200. Examples of the communication unit 110 may include a Bluetooth communication unit, a Bluetooth Low Energy (BLE) communication unit, a near-field communication unit, a wireless local area network (WLAN) (Wi-Fi) communication unit, a Zigbee communication unit, an Infrared Data Association (IrDA) communication unit, a Wi-Fi direct (WFD) communication unit, an ultra-wideband (UWB) communication unit, an Ant+ communication unit, etc., and/or may include a communication unit exchanging a wireless signal with at least one of a base station, an external terminal, a server on a mobile communication network, etc., but are not limited thereto. Here, the wireless signal may be a voice call signal, a video call signal, and/or data in any one of various formats according to transmission and reception of a text/multimedia message, but is not limited thereto.

The database 120 performs a function of storing and managing a binary and binary-related data to be transmitted and received by the binary merging device 100. In FIG. 2, the database 120 is provided inside the binary merging device 100, but this is only for convenience of description, and according to other example embodiments, the database 120 may be provided in a device outside the binary merging device 100. The database 120 may include a storage medium of at least one type from among a flash memory type, a hard disk type, a multimedia card micro type, a card-type memory (for example, a secure digital (SD) or extreme digital (XD) memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and/or an optical disk, etc. Also, the binary merging device 100 may operate a web storage and/or cloud server performing a storage function of the database 120 on the Internet.

The controller 130 generally controls overall operations of the binary merging device 100. For example, the controller 130 may generally control the communication unit 110, the database 120, etc. by executing programs stored in the database 120. The controller 130 may include any type of apparatus capable of processing data, such as at least one processor. Here, the 'processor' may be, for example, a data processing device embedded in hardware and having a circuit physically structured to perform a function expressed in a code or command included in a program. As such, examples of the data processing device embedded in hardware may include processing devices, such as a microprocessor, a central processing unit (CPU), a processor core, a multiprocessor, a multi-core processor, an application-specific integrated circuit (ASIC), and a field-programmable gate array (FPGA), but the example embodiments of the present disclosure are not limited thereto.

Figure 3:
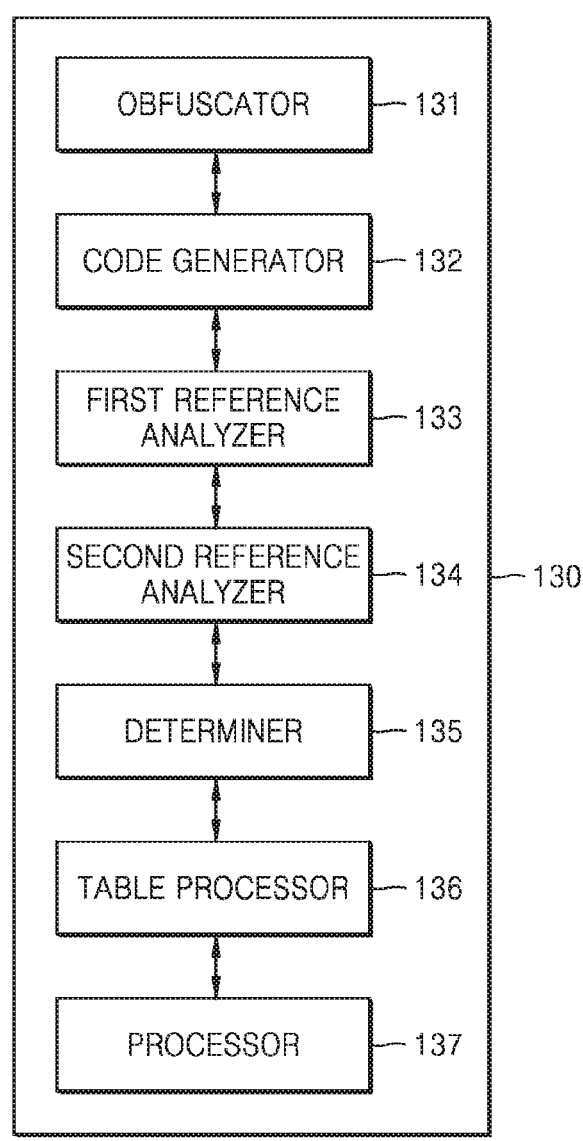
FIG. 3 is a diagram of a structure of a controller according to at least one example embodiment of the present disclosure.

Referring to FIG. 3 in which a structure of a controller 130 is illustrated in detail, the controller 130 may include a code generator 131, an obfuscator 132, a first reference analyzer 133, a second reference analyzer 134, a determiner 135, a table processor 136, and/or a processor 137, in order to perform a function of merging a first binary, i.e., an original binary code of a software application, and a second binary, i.e., a second binary code, with respect to an additional module. Here, the first and second binaries that are merged may be binaries executed in a mobile environment, for example, by a smart phone, a mobile phone, or the like.

The code generator 131 generates a second binary to be injected into a first binary, i.e., an original binary of an application. Here, the second binary is a file in which a source file for decoding the first binary, i.e., the original binary of the application, is built, and may be implemented by including at least one function of decoding the first binary, and at least one function of replacing an address table for the second binary with an address table for the first binary. The second binary may refer to a programming interface (e.g., application programming interface (API), framework, code extension, etc.) different from a programming interface of the first binary. The second binary generates an address table including an address value of an area in which at least one function included in the programming interface of the second binary. The second binary may rewrite the programming interface and/or the address table back to the programming interface and/or the address table for the first binary after execution is complete. Also, the second binary may include code related to replacement and restoration of a programming table and/or an address table. In detail, the second binary may include code restoring the programming table and/or the address table corresponding to the first binary, before executing the first binary, i.e., the original binary of the application. In particular, the second binary is prepared in a sign system used to prepare a program performing a job in a computer, and may be implemented in a language, such as an assembly language, Fortran, C, C++, and/or Java, but is not limited thereto.

The obfuscator 132 obfuscates the first binary, i.e., the original binary of the application. Here, obfuscation is a type of program conversion, and is aimed at reducing and/or preventing an attack through reverse engineering by making a code difficult to be read. Obfuscation techniques may include layout obfuscation, data obfuscation, aggregation obfuscation, control obfuscation, etc. Each obfuscation technique may be performed via one method from among obfuscation using a symmetrical key and obfuscation using an asymmetrical key, which are well known to one of ordinary skill in the art.

The first reference analyzer 133 extracts a first programming interface related to the first binary. A called location and a defined location of one or more functions included in a first source file, i.e., a source of the first binary, may be different, and at this time, the first source file may refer to a file in which a first function is defined, so as to execute the first function that is not defined in a called file. Referring to a defined file so as to execute the first function is referred to as a programming interface. The first binary that built (e.g., compiled, interpreted, etc.) the first source file having a reference relationship of the first function includes a table (hereinafter, referred to as an address table) of an address value of a location of an area where the first function is defined, so as to quickly call a file in which the first function is defined. The first reference analyzer 133 extracts the first programming interface related to the first binary by using the address table included in the first binary.

The second reference analyzer 134 extracts a second programming interface related to the second binary. The second programming interface denotes a reference relationship, wherein a file in which a second function is called refers to a file in which a second function is defined, as one or more second functions included in the second binary are defined from an external file. The second reference analyzer 134 may extract the programming interface of the second binary by using the address table included in the second binary. Here, a programming interface matches and stores a function name and an address value of an area where a function is defined, wherein the function name and the address value may each include a binary value.

The determiner 135 compares the extracted first programming interface and the extracted second programming interface to determine whether the first and second programming interfaces are completely the same. The determiner 135 may determine whether the first and second programming interfaces are the same by sequentially extracting a function name and an address value included in the first programming interface, and individually determining whether the extracted function name and address value are included in the second programming interface.

When the first and second programming interfaces are not completely the same based on a result of the determination, the table processor 136 replaces the first address table corresponding to the first programming interface with the second address table corresponding to the second programming interface. Accordingly, the binary merging device 100 according to at least one example embodiment of the present disclosure may add a module to be added without a source file of a built binary, and module addition to an original binary becomes possible by merging an address table and a binary of the added module to an original binary. In particular, the binary merging device 100 according to at least one example embodiment of the present disclosure may reduce and/or prevent an application from being attacked by hackers or a virus, by merging, with an original binary, a binary of an additional module for obfuscating and decoding of a binary. Also, the binary merging device 100 according to at least one example embodiment of the present disclosure may add a security module with respect to a binary of an application, in a situation where it is difficult to reveal a source file due to fear of technology leakage or the desire for secrecy protection (e.g., protection of trade secrets, etc.).

The processor 137 generates a final binary in which the first binary and the second binary are merged, and sets an entry point of the final binary to be the second binary.

According to another example embodiment, the binary merging device 100 may replace the address table of the application with the second address table corresponding to the second programming interface corresponding to the second binary, without execution of the first reference analyzer 133 and the determiner 135. Accordingly, the binary merging device 100 according to at least one example embodiment of the present disclosure may pursue an original purpose of merging binaries without a comparison procedure.

Also, according to a selective example embodiment, the binary merging device 100 may further include a binary transmitter (not shown) that stores and manages a binary of one or more applications, and transmits a final binary of the application in response to a download request from the user terminals 200 and 400. Also, the binary merging device 100 may further include a binary receiver (not shown) that receives an original binary of an application from the user terminals 200 and 400 of one or more managers. The binary merging device 100 may merge the second binary, i.e., a security-related module and/or other code module, with the first binary, i.e., an original binary of an application received from the user terminals 200 and 400 of a manager, and transmit the obtained final binary to the user terminal that transmitted a download request with respect to the application.

Figure 4:
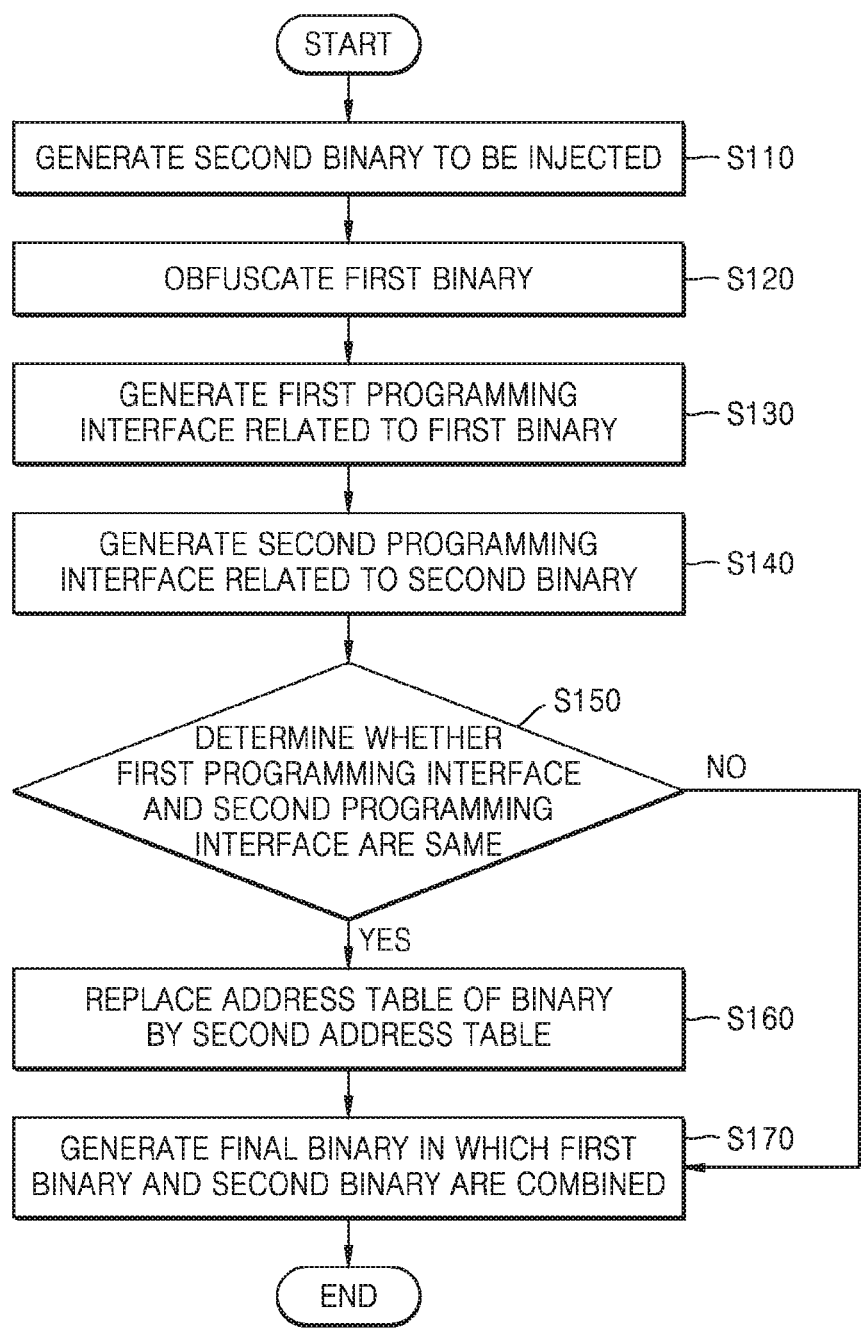
FIG. 4 is a flowchart of a binary merging method according to at least one example embodiment of the present disclosure.

FIG. 4 is a flowchart of a binary merging method according to at least one example embodiment of the present disclosure.

Referring to FIG. 4, the binary merging method according to at least one example embodiment of the present disclosure may include an obfuscation operation (operation S110), a binary generation operation (operation S120), a first programming interface generation operation (operation S130), a second programming interface generation operation (operation S140), a determination operation (operation S150), and a table processor operation (operation S160), but the example embodiments are not limited thereto.

In operation S110, the binary merging device 100 generates a second binary to be injected into a first binary, i.e., an original binary of an application.

In operation S120, the binary merging device 100 obfuscates the first binary, i.e., the original binary of the application. Here, obfuscation is a type of program conversion, and is aimed at reducing and/or preventing an attack through reverse engineering by making a code difficult to be read.

In operation S130, the binary merging device 100 extracts a first programming interface related to the first binary.

In operation S140, the binary merging device 100 extracts a second programming interface related to the second binary.

In operation S150, the binary merging device 100 optionally compares the extracted first and second programming interfaces to determine whether the first and second programming interfaces are completely the same. Based on the result of the comparison of the first and second programming interfaces, the binary merge device may not perform operation S150.

In operation S160, when the first and second programming interfaces are not completely the same based on a result of the determining, the binary merging device 100 replaces a first address table corresponding to the first programming interface with a second address table corresponding to the second programming interface.

Figure 5:
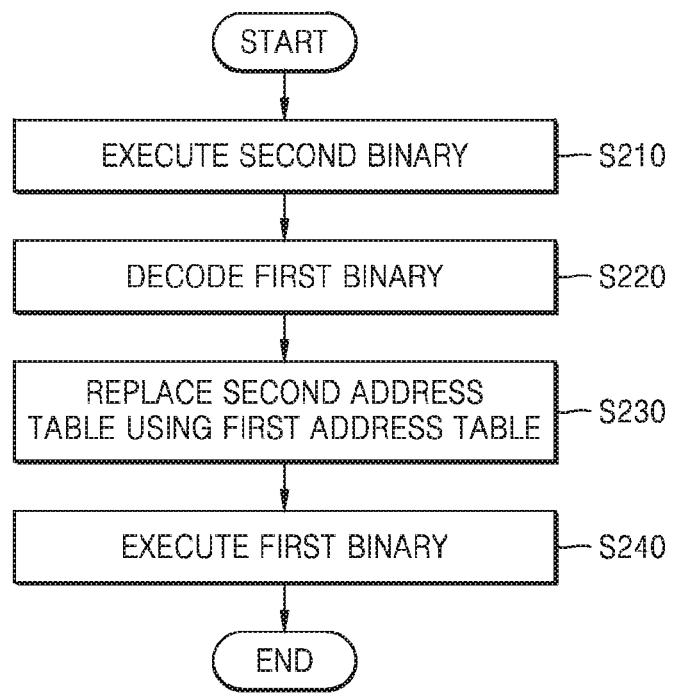
FIG. 5 is a flowchart of a method of executing a binary generated by the binary merging device according to at least one example embodiment of the present disclosure.

FIG. 5 is a flowchart of a method of executing a binary generated by the binary merging device 100 according to at least one example embodiment.

A binary generated by the binary merging device 100 is transmitted to and executed by the user terminal 200 and/or 400, and referring to FIG. 5, the method of executing a binary may include a second binary execution operation (operation S210), a first binary decoding operation (operation S220), an address table replacement operation (operation S230), and a first binary execution operation (operation S240), but is not limited thereto.

Before operation S210, the user terminal 200 and/or 400 transmits a binary download request with respect to an application to the binary merging device 100, and, in response to the binary download request, receives a binary with respect to the application from the binary merging device 100.

In operation S210, the user terminal 200 and/or 400 executes the binary of the application in correspondence with an execution input of a user with respect to the application. Here, a second binary, i.e., an entry point of the binary, is executed according to a code of the binary received by the binary merging device 100.

In operation S220, a controller of the user terminal 200 and/or 400 decodes a first binary. Here, a decoding process is a process of decoding obfuscation of the first binary and is performed via a method related to a method of the obfuscation. For example, when the first binary is obfuscated by using a symmetric key, a process of decoding the first binary may be performed by using a symmetric key, and when the first binary is obfuscated by using an asymmetric key, the first binary may be decoded by using a public key pairing with a private key used in the obfuscation process. As shown in FIG. 3, the second binary includes a decoding algorithm pairing with an algorithm for obfuscating the first binary, and thus is used to decode the first binary. A decoding logic is not limited to a particular encryption algorithm, and a binary merging device and a binary merging method, according to at least one example embodiment of the present disclosure, may perform obfuscation using an encoding technique so as to reduce a decoding time.

In operation S230, the controller of the user terminal 200 and/or 400 replaces an address table included in the binary with a first address table corresponding to the first binary. The first address table includes information about a definition area of one or more functions included in the first binary, and may include a function name and an address value of an area where a function is defined.

In operation S240, the controller of the user terminal 200 and/or 400 executes the first binary.

Figure 6:
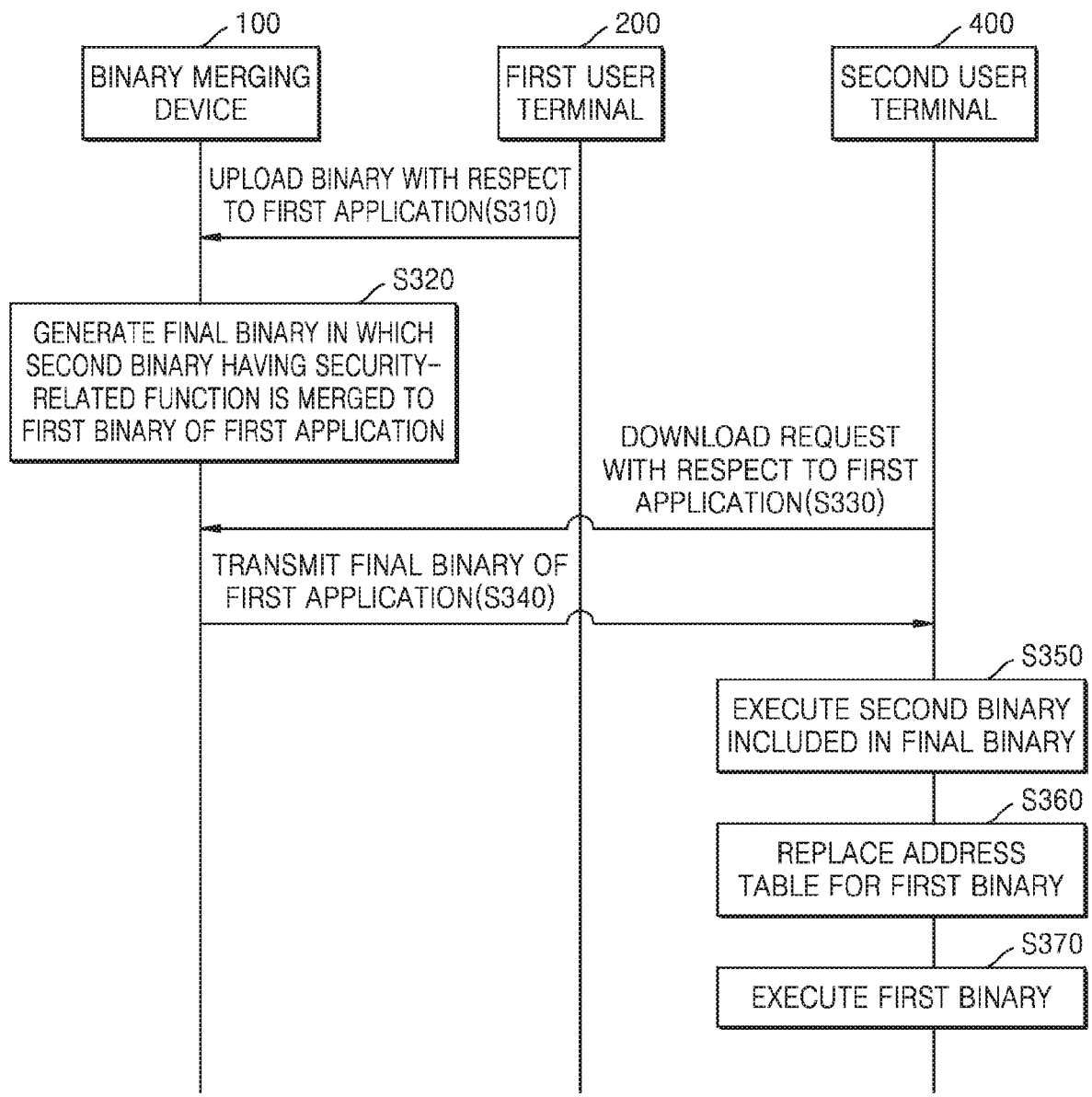
FIG. 6 is a diagram illustrating data transmission and reception, and operations, between the binary merging device, a first user terminal, and a second user terminal according to at least one example embodiment of the present disclosure.
Figure 7:
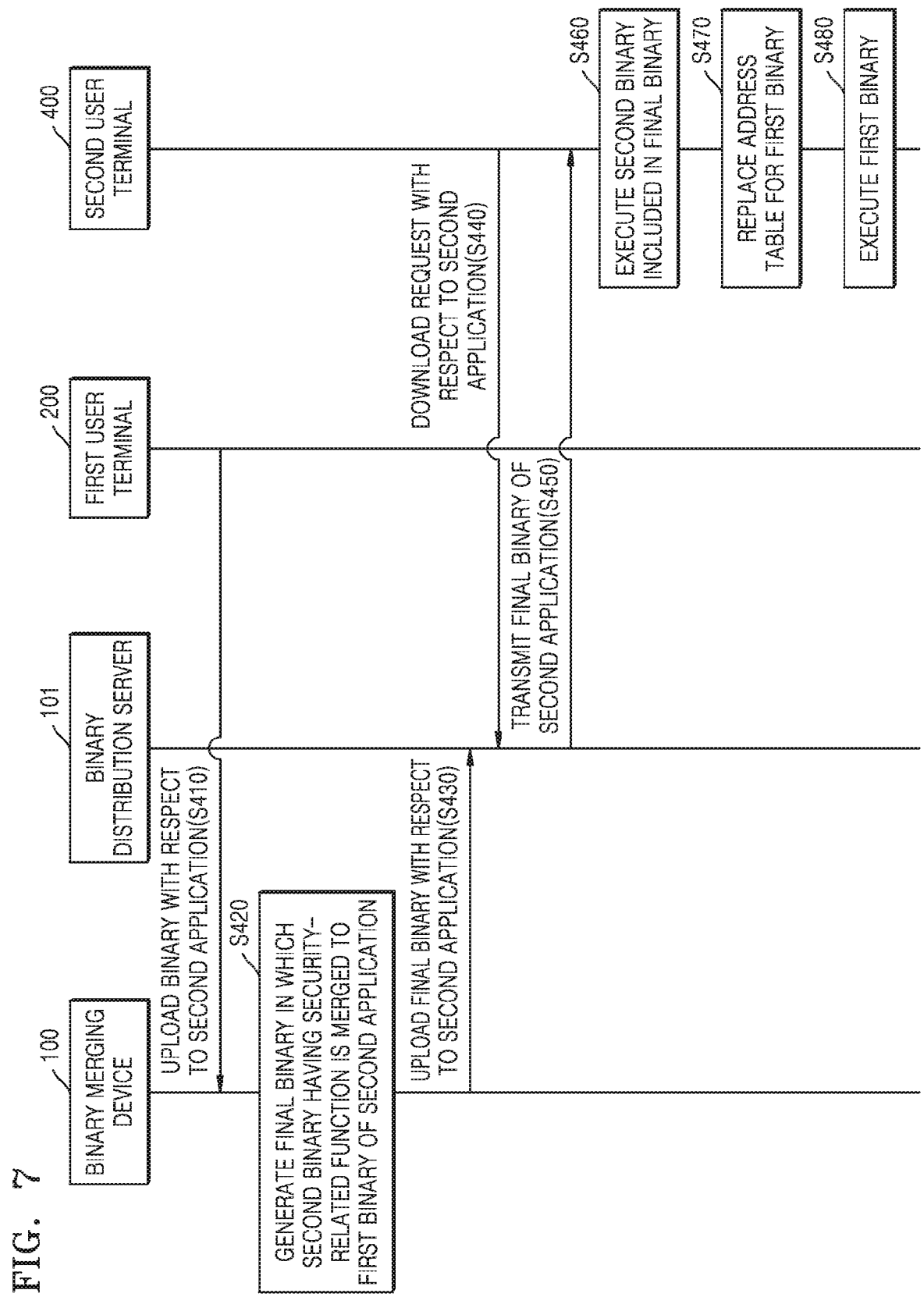
FIG. 7 is a diagram illustrating data transmission and reception, and operations, between the binary merging device, a first user terminal, and a second user terminal according to at least one example embodiment of the present disclosure.

FIGS. 6 and 7 are diagrams illustrating operations and data transmission and reception between the binary merging device 100, a first user terminal 200, and a second user terminal 400 according to some example embodiments.

Referring to at least one example embodiment shown in FIG. 6, the binary merging device 100 performs not only a function of storing and managing a distribution binary of an application, but also a function of generating the distribution binary of the application.

In operation S310, the binary merging device 100 receives, from the first user terminal 200, a binary upload signal with respect to a first application. Here, the binary upload signal with respect to the first application is a signal for uploading a binary of the first application so as to distribute the first application, may include information about the first binary and the binary of the first application, and may also include a detailed description, a developer, a development company, a purpose, a user review, a grade, price information, and related content of the first application, which are to be provided to a user.

In operation S320, the binary merging device 100 generates a final binary in which a second binary having an additional function is merged with the first binary, i.e., an original binary of the first application, in correspondence with the binary upload signal. In particular, the second binary may have a security-related function, but is not limited thereto. Accordingly, the binary merging device 100 may obfuscate the original binary without having to decode the original binary, and merge an additional binary for decryption. The binary merging device 100 may directly store and manage the final binary of the first application, and transmit the final binary of the first application to a binary distribution apparatus for managing a distribution version of an application.

In a distribution process of a binary, in operation S330, the binary merging device 100 receives, from the second user terminal 400, a download request with respect to the first application, and in operation S340, transmits the final binary of the first application to the second user terminal 400 in correspondence with the download request.

Upon receiving the final binary, the second user terminal 400 executes the final binary with respect to the first application in operation S350. The second user terminal 400 executes the second binary included in the final binary, replaces an address table of the final binary with an address table for the first binary in operation S360, and executes the first binary in operation S370.

As such, the binary distribution system 1 according to at least one example embodiment of the present disclosure may store and manage one or more binaries received from a terminal of a developer or manger according to applications, and merge a security binary, i.e., a security-related module for reducing and/or preventing forgery or falsification of the received one or more binaries. Through the merged security binary, a final binary downloaded in the user terminal 200 or 400 may maintain an encoded state, and may be protected from an attack by a malignant code or virus in real time.

According to at least one example embodiment shown in FIG. 7, the binary merging device 100 performs a function of generating a distribution binary of an application, and a separate binary distribution device performs a function of distributing the distribution binary of the application, but is not limited thereto.

In operation S410, the binary merging device 100 receives, from the first user terminal 200, a binary upload signal with respect to a second application.

In operation S420, the binary merging device 100 generates a final binary in which a second binary having an additional function is merged with a first binary, i.e., an original binary of the second application, in correspondence with the binary upload signal.

In a distribution process of a binary, in operation S430, the binary merging device 100 transmits the final binary of the second application to a binary distribution server 101. In operation S440, the binary distribution server 101 receives, from the second user terminal 400, a download request with respect to the second application, and in operation S450, transmits the final binary of the second application to the second user terminal 400, in correspondence with the download request.

Upon receiving the final binary, in operation S460, the second user terminal 400 executes the final binary of the second application. The second user terminal 400 executes the second binary included in the first binary, replaces an address table of the final binary with an address table for the first binary in operation S470, and executes the first binary in operation S480. Here, the first user terminal and the second user terminal denote that user terminals are distinguished from each other, and do not denote the same terminals as the first user terminal and the second user terminal of FIG. 6.

Figure 8:
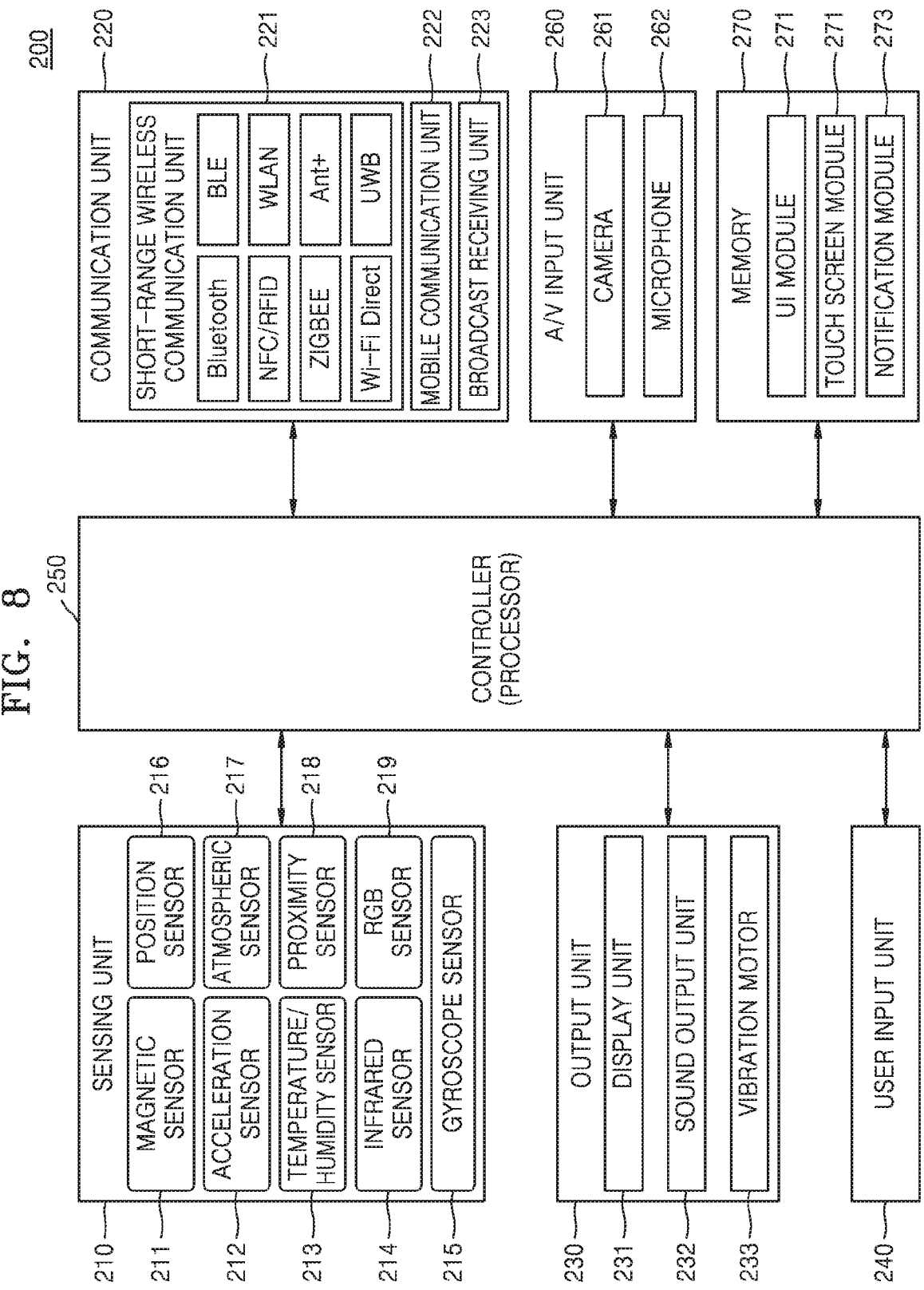
FIG. 8 is a diagram of a structure of a user terminal according to at least one example embodiment of the present disclosure.

FIG. 8 is a diagram of a structure of a user terminal according to at least one example embodiment.

Referring to FIG. 8, the user terminal 200 according to at least one example embodiment of the present disclosure may include a sensing unit 210, a communication unit, an output unit 230, a controller 240, a user input unit 250, an audio/video (NV) input unit 260, and a memory 270, but is not limited thereto.

Hereinafter, the above components are sequentially described.

The sensing unit 210 obtains location information of the user terminal 200. The sensing unit 210 may obtain moving speed information and moving time information when the user terminal 200 moves, and determine changed location information of the user terminal 200.

The sensing unit 210 may include at least one of a magnetic sensor 211, an acceleration sensor 212, a temperature/humidity sensor 213, an infrared sensor 214, a gyroscope sensor 215, a position sensor 216 (for example, Global Positioning System (GPS)), an atmospheric sensor 217, a proximity sensor 218, and a red-green-blue (RGB) sensor 219 (illuminance sensor), but is not limited thereto. Because functions of each sensor may be intuitively inferred by one of ordinary skill in the art based on its name, details thereof are not described herein.

The sensing unit 210 may obtain state information of the user terminal 200. The sensing unit 210 may obtain information about at least one of an inclination of the user terminal 200, a direction where the user terminal 200 is located, and movement of the user terminal 200.

Also, the sensing unit 210 may detect a user input. The sensing unit 210 may obtain information about at least one of a time length of the detected user input and a type of the user input.

The communication unit 220 may include one or more components enabling communication between a user terminal 201 and another user terminal 202, or between the user terminal 200 and a binary merging device 100. For example, the communication unit 220 may include a short-range wireless communication unit 221, a mobile communication unit 222, and a broadcast receiving unit 223, but is not limited thereto.

The short-range communication unit 221 may include a Bluetooth communication unit, a Bluetooth Low Energy (BLE) communication unit, a near-field communication (NFC) unit, a wireless local area network (WLAN) (Wi-Fi) communication unit, a Zigbee communication unit, an Infrared Data Association (IrDA) communication unit, a Wi-Fi direct (WFD) communication unit, an ultra-wideband (UWB) communication unit, and/or an Ant+ communication unit, but is not limited thereto.

The mobile communication unit 222 transmits and receives a wireless signal to and from at least one of a base station, an external terminal, and/or a server, etc., on a mobile communication network. Here, the wireless signal may include data having various formats according to transmission and reception of a voice call signal, a video telephone call signal, and/or a text/multimedia message, etc.

The broadcast receiving unit 223 receives a broadcast signal and/or broadcast related information from an external source, through a broadcast channel. The broadcast channel may include a satellite channel and/or a terrestrial broadcasting channel. According to at least one example embodiment, the user terminal 200 may not include the broadcast receiving unit 223.

The output unit 230 may include a display unit 231, a sound output unit 232, and a vibration motor 233, etc.

The display unit 231 outputs information processed by the user terminal 200. The user may view a screen provided by the binary merging device 100 through the display unit 231.

Meanwhile, when the display unit 231 is configured as a touch screen by forming a layer structure with a touch pad, the display unit 231 may also be used as an input device as well as an output device. The display unit 231 may include at least one of a liquid crystal display (LCD), a thin-film-transistor liquid-crystal display (TFT-LCD), an organic light-emitting diode (OLED), a flexible display, a 3D display, and an electrophoretic display. Also, according to at least one example embodiment of the user terminal 200, the user terminal 200 may include at least two display units 231. Here, the at least two display units 231 may be disposed to face each other by using a hinge.

The sound output unit 232 outputs audio data received from the communication unit 220 or stored in the memory 270. Also, the sound output unit 232 outputs a sound signal related to a function performed by the user terminal 200. The sound output unit 232 may include a speaker or a buzzer.

The vibration motor 233 may output a vibration signal. For example, the vibration motor 233 may output a vibration signal corresponding to an output of audio data and/or video data. Also, the vibration motor 233 may output a vibration signal when a touch screen is touched.

The controller 240 controls overall operations of the user terminal 200. For example, the controller 240 may generally control the sensing unit 210, the communication unit 220, the output unit 230, the user input unit 250, the A/V input unit 260, and the memory 270 by executing programs stored in the memory 270.

The user input unit 250 is a unit for a user to input data for controlling the user terminal 200. Examples of the user input unit 250 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The A/V input unit 260 receives an audio signal and/or a video signal, and may include the camera 261, a microphone 262, etc. The camera 261 may obtain an image frame of a still image or a moving image via an image sensor in a video telephone mode or a photographing mode. An image captured via the image sensor may be processed by the controller 240 and/or a separate image processor (not shown).

An image frame processed by the camera 261 may be stored in the memory 270 and/or transmitted to an external device through the communication unit 220. According to at least one example embodiment of a terminal, there may be at least two cameras 261.

The microphone 262 receives an external sound signal and processes the external sound signal to electric voice data. For example, the microphone 262 may receive a sound signal from an external device or a narrator. The microphone 262 may use any one of various noise removing algorithms to remove noise generated while receiving the external sound signal.

The memory 270 may store programs for processes and controls of the controller 240, and may store input/output data (for example, a plurality of menus, a plurality of first layer sub-menus corresponding to each of the plurality of menus, and a plurality of second layer sub-menus corresponding to each of the plurality of first layer sub-menus, etc.).

The memory 270 may store and/or pre-store metadata related to an application, such as a shopping application, etc. Also, the memory 270 may store information about a length and a type of an obtained user input. The memory 270 may store state information of the user terminal 200.

The memory 270 may include at least one type of non-transitory storage medium from among a flash memory, a hard disk, a multimedia card micro-type memory, a card-type memory (for example, a secure digital (SD) card or an extreme digital (XD) card), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk. Also, the user terminal 200 may operate web storage and/or a cloud server performing a storage function of the memory 270 on the Internet.

Programs stored in the memory 270 may be classified into a plurality of modules based on functions, and may be classified into a user interface (UI) module 271, a touch screen module 272, and a notification module 273, but is not limited thereto.

The UI module 271 may provide a specialized UI or GUI linked to the user terminal 200 according to applications, such as game applications, etc. The touch screen module 272 may detect a touch gesture of a user on a touch screen, and transmit information about the touch gesture to the controller 240. The touch screen module 272 according to at least one example embodiment of the present disclosure may recognize and analyze a touch code. The touch screen module 272 may be configured as separate hardware including a controller.

Various sensors may be disposed inside and/or around the touch screen to detect a touch or a proximity touch on the touch screen. An example of a sensor for detecting a touch on the touch screen includes a tactile sensor. The tactile sensor detects contact that can be felt by a person on a certain object. The tactile sensor may detect various types of information, such as roughness of a contact surface, rigidness of a contact object, and temperature of a touch point. Also, an example of a sensor for detecting a touch on the touch screen includes a proximity sensor. The proximity sensor detects existence of an object approaching or near a predetermined detection surface by using an electromagnetic field force or infrared ray, without having to detect a mechanical contact. Examples of the proximity sensor include a transmission photoelectric sensor, a direct reflective-type photoelectric sensor, a mirror reflective-type photoelectric sensor, a high-frequency oscillation proximity sensor, a capacitance-type proximity sensor, a magnetic-type proximity sensor, and an infrared proximity sensor. Examples of a touch gesture of a user include tap, touch and hold, double-tap, drag, panning, flick, drag-and-drop, and swipe.

The notification module 273 may generate a signal for notifying event generation in the user terminal 200. The notification module 273 may output a notification signal in a video signal format through the display unit 231, in an audio signal format through the sound output unit 232, and/or in a vibration signal format through the vibration motor 233.

Figures 9A, 9B:
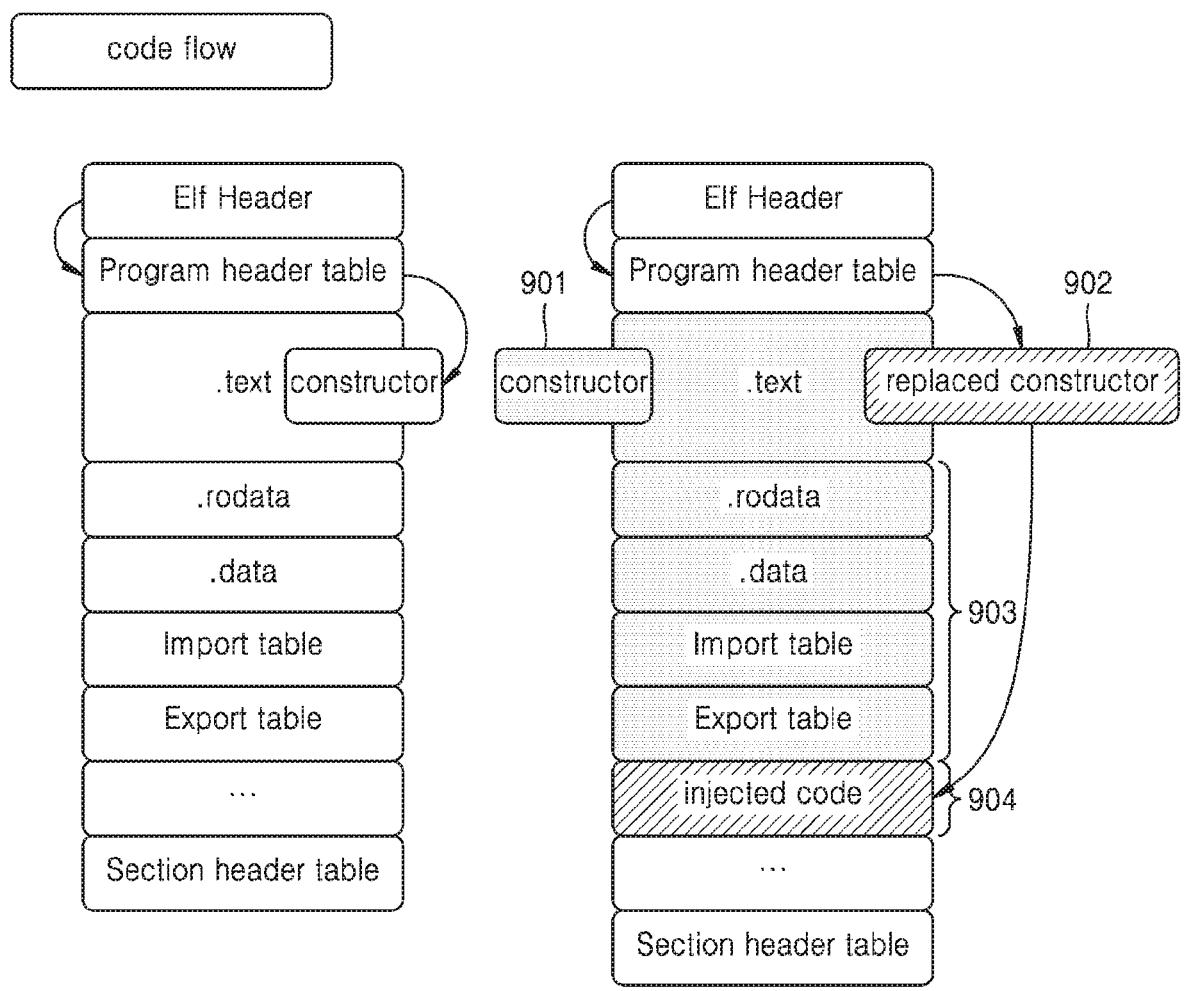

FIGS. 9A and 9B are diagrams for describing a binary structure according to at least one example embodiment, wherein FIG. 9A is a diagram of a structure of a first binary before merging binaries, and FIG. 9B is a diagram of a structure of a final binary in which the first binary and a second binary are merged.

As shown in FIGS. 9A and 9B, a binary of an application according to at least one example embodiment of the present disclosure may have an executable and linkable format (ELF). In the ELF, the binary of the application may include an ELF header, a program header table, .text, .rodata, .data, an import table, an export table, an injected code, and a section header table.

(1) The ELF header is divided into three areas of an offset, a field, and a size.

(2) The program header table denotes a program header of an executable or sharable object file.

(3) .text: denotes an area including text or executable commands of a program.

(4) .rodata: denotes an area including read-only data typically used in a nonwritable segment in an image of a process.

(5) .data: denotes an area including initialized data provided to a program memory area.

(6) Section header table: denotes an area including a list of groups of sections of binaries.

Import Table: denotes an area storing a location and a name of an external function used by a binary.

Export Table: denotes an area storing a location and a name of a library function usable by a binary.

Figure 10:
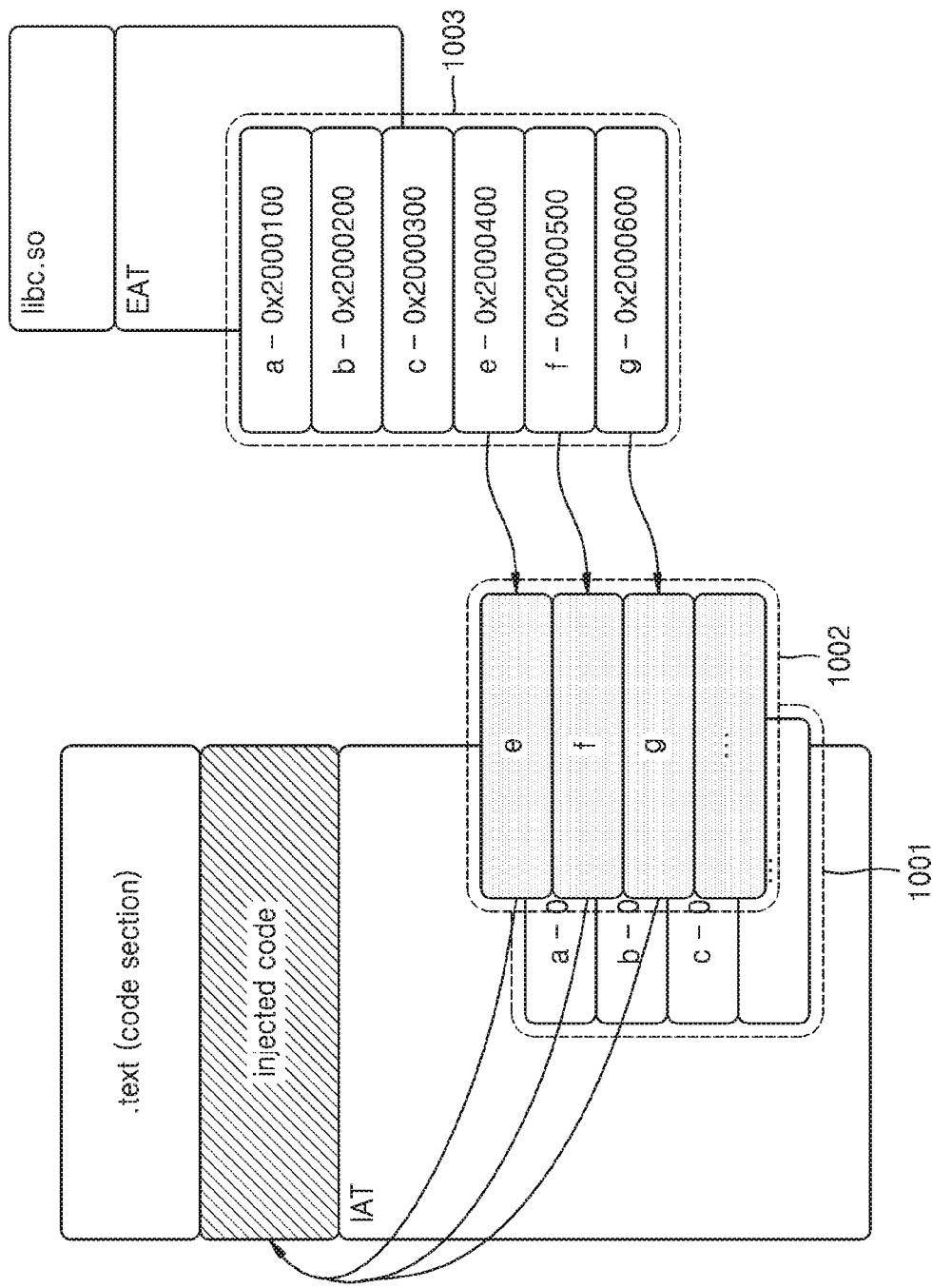
FIG. 10 is a diagram illustrating a connection relationship between a code section of a binary and an address table according to at least one example embodiment of the present disclosure.

FIG. 10 is a diagram illustrating a connection relationship between a code section of a binary and an address table.

A binary merging device according to at least one example embodiment of the present disclosure may perform processes of replacing an address table 901 of an original binary with an address table 902 corresponding to a merged binary, and then restoring the address table 901 of the original binary, for a normal operation of the merged binary. Here, the address table 902 may call a definition of a function through an address value of a region defined in a library.

One or more of the above example embodiments may be embodied in the form of a computer program including computer readable instructions that can be run in and/or executed by a computer through various elements. The computer program may be recorded on a non-transitory computer-readable recording medium. Examples of the non-transitory computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories), etc. Furthermore, the computer program may be embodied on a formless medium that can be transmitted and distributed in a network, e.g., software or an application.

Meanwhile, the computer programs may be specially designed or well known to one of ordinary skill in the computer software field. Examples of the computer programs include mechanical code prepared by a compiler, and high-level languages executable by a computer by using an interpreter.

The particular implementations shown and described herein are illustrative examples of the disclosure and are not intended to otherwise limit the scope of the disclosure in any way. For the sake of brevity, conventional electronics, control systems, software development, and other functional aspects of the systems (and components of the individual operating components of the systems) may not be described in detail. Furthermore, the connecting lines or connectors shown in the various figures presented are intended to represent example functional relationships and/or physical or logical couplings between the various elements. It should be noted that many alternative or additional functional relationships, physical connections, or logical connections may be present in a practical device. Moreover, no item or component is essential to the practice of the disclosure unless the element is specifically described as "essential" or "critical".

The use of the terms "a", "an", "the", and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the present disclosure.

What is claimed is:

1. A binary merging method performed by a binary merging device, the binary merging device comprising a memory storing a first binary, and a controller, wherein the binary merging method comprises:
   generating, by the controller, a second binary to be injected into the first binary; and
   generating, by the controller, a final binary in which the first binary and the second binary are merged,
   wherein the final binary is implemented to cause execution of the second binary using a second programming interface, replacement of the second programming interface with a first programming interface, and execution of the first binary using a first programming interface,
   the first programming interface comprises a reference relationship between at least one first function and first external files called by the at least one first function based on a first address table,
   the first address table comprises a first address value of a first area where the at least one first function included in a first source file that is a source of the first binary is defined;
   the second programming interface comprises a reference relationship between at least one second function and second external files called by the at least one second function based on a second address table, and
   the second address table comprises a second address value of a second area where the at least one second function included in a second source file that is a source of the second binary is defined.

2. The binary merging method of claim 1, wherein the final binary is implemented to cause:
   sequential extraction of a function name of the at least one first function included in the first programming interface and the first address value in which the at least one first function is defined;
   individual comparison of whether the extracted function name and the extracted address value are included in the second programming interface, and when result of the individual comparison indicate that the second programming interface is not completely the same as the first programming interface, replacement of the second programming interface with the first programming interface.

3. The binary merging method of claim 1, further comprising:
   obfuscating, by the controller, the first binary,
   wherein the second binary comprises a decoding function for decoding the obfuscated first binary.

4. A binary merging device comprising:
   a memory having computer readable instructions stored thereon; and
   at least one processor configured to execute the computer readable instructions to,
     generate a second binary to be injected into a first binary,
     generate a final binary in which the first binary and the second binary are merged,
     generate a first programming interface which comprises a reference relationship between at least one first function and first external files called by the at least one first functions based on a first address table, and
     generate a second programming interface which comprises a reference relationship between at least one second function and second external files called by the at least one second function based on a second address table,
   wherein the final binary is implemented to cause execution of the second binary using the second programming interface, replacement of the second programming interface with the first programming interface, and execution of the first binary using the first programming interface,
   the first address table comprises a first address value of a first area where the at least one first function included in a first source file that is a source of the first binary is defined, and
   the second address table comprises a second address value of a second area where the at least one second function included in a second source file that is a source of the second binary is defined.

5. The binary merging device of claim 4, wherein the final binary is implemented to cause:

sequential extraction of a function name of the first function included in the first programming interface and the first address value in which the first function is defined;

individual comparison of whether the extracted function name and the extracted address value are included in the second programming interface, and replace the second programming interface with the first programming interface when results of the comparison indicate that the second programming interface is not completely the same as the first programming interface.

6. The binary merging device of claim 4, wherein the at least one processor is further configured to obfuscate the first binary, wherein the second binary comprises a decoding function for decoding the obfuscated first binary.

7. A non-transitory computer-readable medium storing computer-readable instructions, which when executed by at least one processor, causes the at least one processor to perform the method of claim 1.

* * * * *